United States Patent [19]

Kubala et al.

[11] Patent Number: 5,982,549

[45] Date of Patent: Nov. 9, 1999

[54] ULTRA-WIDE FIELD VIEWING SYSTEM

[75] Inventors: Kenneth Kubala; Brian Hooker; Lindon Lewis, all of Boulder, Colo.; Andrew Hatch, Kettering, Ohio

[73] Assignee: University Technology Corporation, Boulder, Colo.

[21] Appl. No.: 09/079,489

[22] Filed: May 15, 1998

[51] Int. Cl.[6] .......................... G02B 27/10; G02B 21/18; G02B 23/00; G02B 27/02

[52] U.S. Cl. .......................... 359/618; 359/374; 359/407; 359/480

[58] Field of Search .................................. 359/374–376, 359/618, 404–407, 480–482

[56] References Cited

U.S. PATENT DOCUMENTS

| 5,331,351 | 7/1994 | Haas | 348/558 |
|---|---|---|---|
| 5,629,776 | 5/1997 | Lagoni | 386/45 |

OTHER PUBLICATIONS

Alvertos, N. and Hall, E.L. (1984) "Omnidirectional viewing for robot vision," Proceedings of the SPIE—The International Society for Optical Engineering 449, Pt. 1, pp. 230–239.

Daniilidis, K. (1995) "Computation of 3D–motion parameters using the log–polar transform," *Computer Analysis of Images and Patterns*, 6th International Conference, CAIP '95, pp. 82–89.

Debusschere, et al. (1990) "A retinal CCD Sensor for fast 2D shape recognition and tracking" *Sensors and Actuators* A21/A23:456–460.

Howlett, E. (1992) "High resolution inserts in wide angle head mounted stereoscopic displays," Proceedings of SPIE, vol. 1669, *Stereoscopic displays and Applications III*, pp. 193–203.

Howlett, E. (1990) "Wide angle orthostereo," Proceedings of the SPIE, vol. 1256, *Stereoscopic displays and Applications*, pp. 210–222.

Kelly, G., et al. (1992) "Helmet–mounted area of interest," Proceedings of SPIE, vol. 1695, *Helmet–mounted displays III*, pp. 58–63.

Kreider, G. and Speigel, V.d (1990) "A retina like space variant CCD sensor," Proceedings of the SPIE, vol. 1242, *Charge–Coupled Devices and Solid State Optical Sensors*, pp. 133–140.

(List continued on next page.)

*Primary Examiner*—Georgia Epps
*Assistant Examiner*—Suzanne Letendre
*Attorney, Agent, or Firm*—Greenlee, Winner and Sullivan, P.C.

[57] ABSTRACT

This invention provides a vision system that increases the field of view of an electronic binocular system without degrading image quality or requiring extremely large format sensors or displays. The vision system comprises an imaging device coupled with a viewing device. The imaging device comprises a compression lens and an image sensor. The viewing device comprises an image display and a decompression lens. The compression lens matches the optical distortion to the human visual acuity curve for field positions greater than an angle θ. Below angle θ there is substantially no distortion. The optimum angle θ depends on the application. For an average individual viewing a landscape the angle θ is about 10°. For different viewing objects, the optimum angle θ varies from about 5° to about 15°. The image sensor can be infrared sensitive for infrared viewing. For low-light level viewing an image intensifier can be positioned between the compression lens and the image sensor. The imaging device can be connected to the viewing device in a unitary structure or the imaging device can be remote from the viewing device. The compression lens and the decompression lens are compound lenses, each comprising a plurality of component lenses. One or more surface of one or more component lens can be aspheric.

23 Claims, 18 Drawing Sheets

OTHER PUBLICATIONS

Kuniyoshi, Y., et al. (1995) "Active stereo vision system with foveated wide angle lenses," *Recent Developments in Computer Vision,* Second Asian Conference on Computer Vision, AACV '95, pp. 191–200.

Lim, F.L., et al. (1996) "Resolution consideration in spatially variant sensors," Proceedings of the $13^{th}$ International Conference on Pattern Recognition 1, pp. 795–799.

Schoenmakers, W. and Roland, B. (1991) "Variable Acuity Optics Study," Summary Final Technical Report under Contract DAAB07–87–C–F059 to Hughes Corp.

Shah, S. and Aggarwal, J.K. (1996) "Intrinsic parameter calibration procedure for a (high–distortion) fish–eye lens camera with distortion model and accuracy estimation" *Pattern Recognition* 29(11):1775–1778.

Shimizu, S., et al. (1996) "A wide angle vision sensor with high distortion lens detection of camera location and gaze direction based on two parallel line algorithm" $22^{nd}$ International Conference on Industrial Electronics Control, and Instrumentation, pp. 1600–1605.

Suematsu, Y. and Hayase, T. (1990) "An advanced vision sensor with fovea" $16^{th}$ Annual Conference of IEEE Industrial Electronics Society 1343, pp. 581–585.

Wetzel, et al. (1990) "Evaluation of eye tracking measurements systems for use with the fiber optic helmet mountain display" *Cockpit displays and visual simulation,* SPIE 1289:163–167.

ULTRA-WIDE FIELD VIEWING SYSTEM

FIELD OF THE INVENTION

This invention relates to variable addressibility imaging devices for ultra-wide field, low-light level vision systems and to compression and decompression lenses adapted to accommodate human eye wander.

BACKGROUND OF INVENTION

There are two applications where electronic binoculars are particularly useful: in low-light level viewing and infrared imaging systems. In the former case, the sensor uses an image intensifier that is imbedded in the design. In the latter case, the sensor detects wavelengths that lie outside the human spectral response.

Generally in electronic imaging systems there are a limited number of pixels in the sensor and the display, so one has to balance the image quality vs. the field of view (FOV). An example of this trade off is using a 600×600-pixel display and matching the display to the maximum resolution of the eye, which is 1 arc minute. In this configuration the maximum full field of view is about 20°×20°. Conventionally if one wants to increase this field of view, the cost will come in the form of a decrease in image quality as limited pixels are distributed over a larger field of view. Alternatively, one can increase the number of pixels in the display, but with a cost penalty.

Recently researchers have begun to investigate the potential usefulness of variable addressibility systems. Much of this research has been in the areas of robot vision and virtual reality. In both cases there is a desire to increase the field of view, using the eye as a generic model. There are three primary methods used to obtain foveated information, log-polar mapping [F. L. Lim et al. (1996) *Proceedings of the 13th International Conference on Pattern Recognition* 1, 795–799; Konstantinos Daniilidis (1995) *Computer Analysis of Images and Patterns, 6th International Conference, CAIP '95*, 82–89], varying the size of CCD elements [G. Kreider and J. Van der Speigel (1990) *Proceedings of the SPIE*, Vol. 1242 *Charge-Coupled Devices and Solid State Optical Sensors* 133–140; I. Debusschere et al. (1990) *Sensors and Actuators* 456–460] and creating special high distortion lenses.

In the virtual reality community, generally the trend is going towards using four displays for each head mounted application [Eric Howlett (1992) *Proceedings of SPIE*, Vol. 1669 *Stereoscopic Displays and Applications III* 193–203; Eric Howlett (1990) *Proceedings of SPIE, Vol. 1256 Stereoscopic Displays and Applications* 210–222]. Two displays are used with a high distorting lens to give a large FOV while the other two are used for high-resolution inserts. Similar techniques are being tested for helmet mounted displays used in flight simulators [George Kelly et al. (1992) *Proceedings of SPIE, Vol.* 1695 *Helmet-Mounted Displays III* 58–63; Paul Wetzel et al. (1990) *Proceedings of SPIE, Vol.* 1289, *Cockpit Displays and Visual Simulation* 163–167]. The drawback of this technique comes in the form of size, weight, cost and complexity.

In the robot vision research areas, special fish-eye lenses have been designed that vary the resolution as a function of field [Yoshikazu Suematsu and Toshiyuki Hayase (1990) *16th Annual Conference of IEEE Industrial Electronics Society* 1343, 581–585; N. Alvertos and E. L. Hall (1984) *Proceedings of the SPIE—The International Society for Optical Engineering* 449, pt. 1, 230–239; Shishir Shah and J. K. Aggarwal (1996) *Pattern Recognition* 29, No. 11, 1775–1788]. A couple of studies have also attempted to match their distortion curves with the visual acuity curve of the human eye [Sohto Shimaizu et al. (1996) $22^{nd}$ *International Conference on Industrial Electronics, Control, and Instrumentation* 1600–1605; Y. Kuniyoshi et al. (1995) *Recent Developments in Computer Vision, Second Asian Conference on Computer Vision, ACCV '95* 191–200]. None of these have been designed to interface with a human.

There has been one previous attempt to use the variable acuity concept to increase the FOV in a night vision goggle application [Wayne Schoenmakers and Benjamin Roland (1991) "Variable Acuity Optics Study," Summary Final Technical Report under Contract DAAB07-87-C-F059 to Hughes Corp.]. A prototype was developed, but the project eventually ended with several unsolved problems. The system was too heavy and bulky for their specific application. It also required several aspheric surfaces, which are expensive to fabricate. These problems were compounded with subjective human factor concerns. Testing personnel noted a disturbing visual effect when viewing through the system. Although the testers did not see any classical optical distortion (straight lines exhibiting the tendency to curve) they did have the feeling that something was amiss off-axis. The poor off-axis resolution distracted the viewer. This made it difficult to concentrate on viewing the on-axis image. There was no known basic engineering explanation for the perceived low resolution.

SUMMARY OF THE INVENTION

This invention provides a vision system that increases the field of view of an electronic binocular system without degrading image quality or requiring extremely large format sensors or displays. The eye's acuity varies across its field of the view, decreasing to 10% of its axial value at only 20°. The vision system of the present invention radially remaps the image to match the varying acuity of the eye. An aspect of this invention is the realization that it is necessary to accommodate eye wander when interfacing electronic vision systems with the human eye. The binoculars of Hughes matched the system distortion to the visual acuity curve, and thus the system had a very small tolerance for eye wander and individual differences in acuity. The vision system of the present invention matches the system distortion to the human visual acuity curve only for field positions greater than an angle $\theta$. Below angle $\theta$ there is substantially no distortion. The optimum angle $\theta$ depends on the individual and the application. For an average individual viewing a landscape the angle $\theta$ is about 10°. For different viewing objects the optimum angle $\theta$ varies from about 5° to about 15°.

The vision system comprises an imaging device coupled with a viewing device. The imaging device comprises a compression lens and an image sensor. The viewing device comprises an image display and a decompression lens. For angles greater than $\theta$ the compression lens performs a nonlinear mapping such that a uniform sensor configuration sees a non-uniform pixel spacing at the object. As a result, each sensor pixel sees a larger area in object space as the field position increases. To allow for eye wander, the lens performs a substantially linear mapping for angles less than $\theta$. The decompression lens remaps the image points to their original positions. This results in an electronic binocular system that has an increased field of view without any perceivable loss in image quality. The non-uniform object sampling results in an image that has a varying resolution across the field. The resolution is constant for angles less than $\theta$ and decreases with field position for angles greater than $\theta$.

The image sensor can be infrared sensitive for infrared viewing. For low-light level viewing an image intensifier can be positioned between the compression lens and the image sensor. The viewing device can include data fusion to overlay a second image on the sensed image. The imaging device can be connected to the viewing device in a unitary structure or the imaging device can be remote from the viewing device. A remote imaging device is useful for space applications. A remote imaging device includes a transmitter to send data to the viewing device, and the viewing device includes a remote-image receiver.

The compression lens and the decompression lens are compound lenses, each comprising a plurality of lenses. The lenses are designed using standard lens design software. The number of lenses and the radius, thickness, aperture radius and refractive index of each lens are designed to give the desired distortion. The manufacturing material, and therefore refractive index, can be different for each lens. To compensate for chromatic aberration, high index lenses are preferably positioned adjacent to low index lenses. One or more surface of one or more lens can be aspheric. Preferably the number of lenses and the number of aspheric surfaces is minimized.

DETAILED DESCRIPTION OF THE INVENTION

Figure 1:
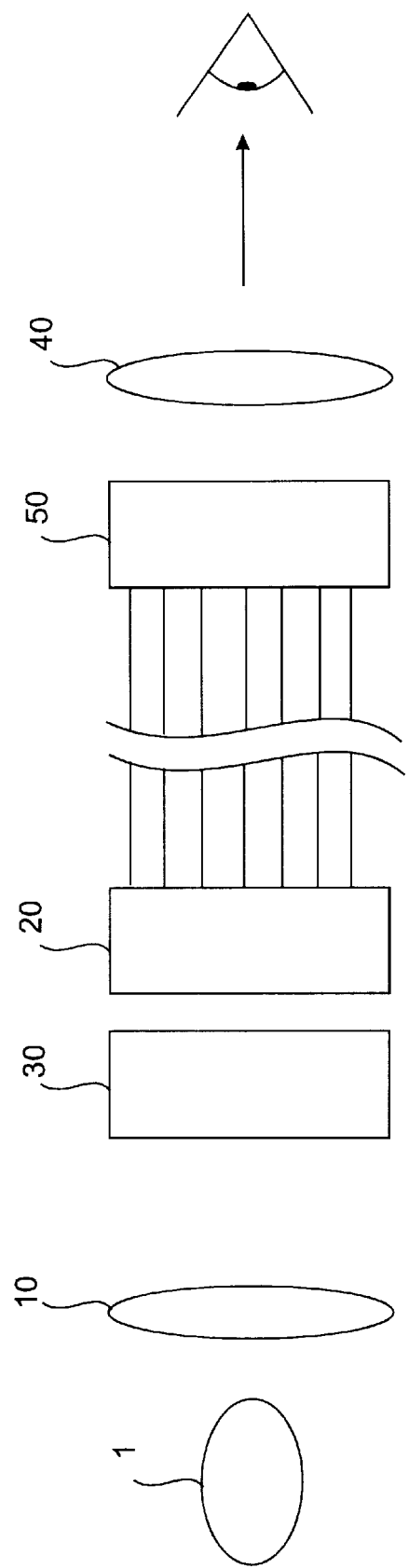
FIG. 1 is a low-light level vision system using a compression lens for imaging and a decompression lens for viewing.

A vision system using two transformation lenses is illustrated in FIG. 1. The vision system comprises an imaging device in combination with a viewing device. The imaging device comprises objective compression lens 10 optically coupled with image sensor 20. The compression lens introduces a distortion to the field of object 1. For field positions greater than about θ the distortion is substantially matched to the human visual acuity function. An optical system is "matched" to the acuity function of the eye if it produces the same change in image resolution as a function of field. The inverse of the acuity is the resolution. Each image point can be shifted using distortion. If the correct distortion function is used, the system will match its output to the acuity function. The distortion function can be calculated using this inverse acuity information. For field positions less than about θ the lens introduces substantially zero distortion. The objective lens compresses the image in a nonlinear fashion, with more compression occurring at the edge of the field than toward the center of the field.

Image sensor 20 is preferably a pixelated image sensor, for example a CCD, having uniform pixel distribution and therefore a constant addressability. The image sensor combined with the compression lens produces an imaging device with variable addressability. At the center of the sensor the lens introduces no distortion and the addressability is constant. Toward the edges of the sensor, the uniform sensor configuration sees a non-uniform pixel spacing at the object. As the field position increases, each pixel sees a larger area in object space. For an infrared vision system, the sensor detects in the infrared frequency range. For a low-light level vision system, image intensifier 30 is placed between the compression lens and the sensor.

The viewing device comprises image display 50 and eyepiece decompression lens 40. The decompression lens remaps the image points to their original positions. The image display is preferably a miniature display. Image sensor 20 is coupled with image display 50. For a unitary vision system the coupling is electronic. For a remote vision system wherein the imaging device is remote from the viewing device, wireless coupling can be employed. In this case, the image sensor comprises an image transmitter and the image display comprises a remote-image receiver, for example a radio wave receiver. In lieu of an image sensor and image display the compressed image can be displayed directly, for example with an image tube phosphor. A decompression lens is used to view the phosphor.

Figure 2:
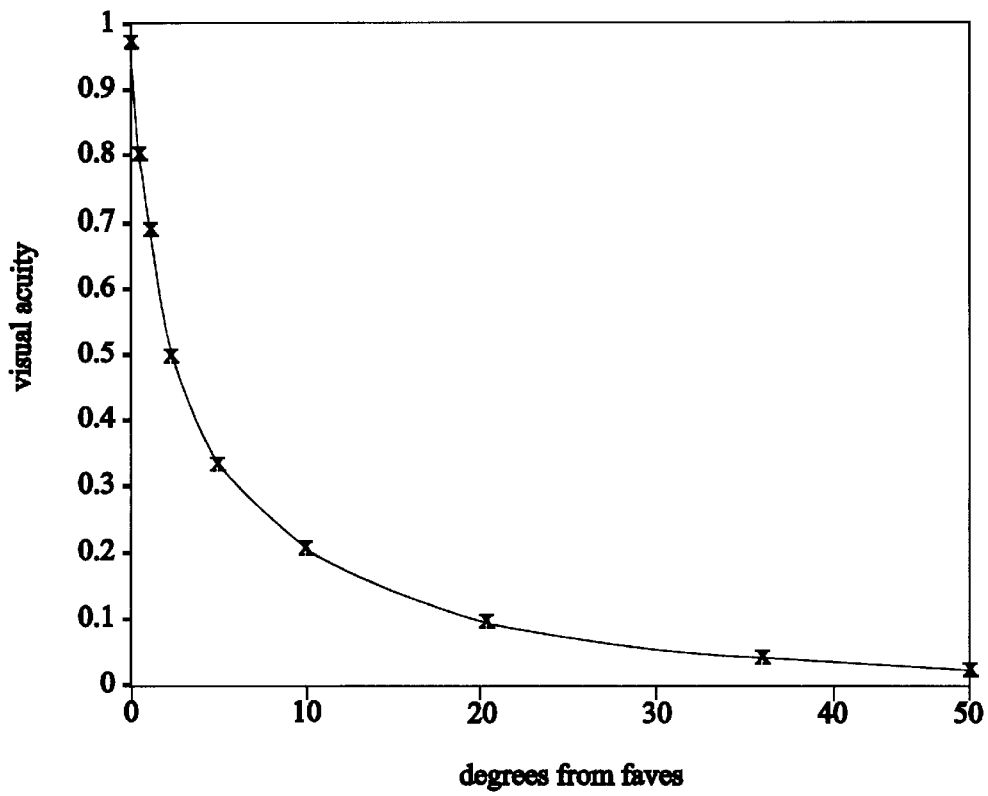
FIG. 2 is the visual acuity curve of the average human observer.

The compression lens of this invention has a composite distortion substantially matched to the human visual acuity function. The term "composite distortion" refers to the net distortion of the group of lenses that form the compound lens. The visual acuity as a function of degrees from fovea is shown in FIG. 2. With increasing field position the visual acuity decreases. At 10° the visual acuity is only 20% of its on-axis acuity. At 50° the visual acuity is nearly zero. The curve is an average of many individuals. The actual acuity is a function not only of the angle but also of the individual and the light level, and to a lesser degree a function of pupil size and the contrast of the object. The illustrated curve represents the phototopic acuity. Although binoculars of this invention can be used at low-light level, the display itself is bright and the distortion is matched to the phototopic acuity function. In an alternative embodiment, the viewing can be done at low-light level and the distortion can be matched to the corresponding acuity function.

The compression lens has a composite distortion substantially matched to the human visual acuity function for field position greater than about θ. The term "substantially matched" refers to a distortion function having the same general shape as the visual acuity function. However, because of the variability of the acuity, it is not necessarily quantitatively identical to a particular acuity measurement. In addition, because of the difficulty in engineering the optical response the actual compression can different from the target function. Small deviation from the target function does not degrade the vision system. The compression is preferably within 5% of the visual acuity function, and more preferably within 3%.

Figure 3:
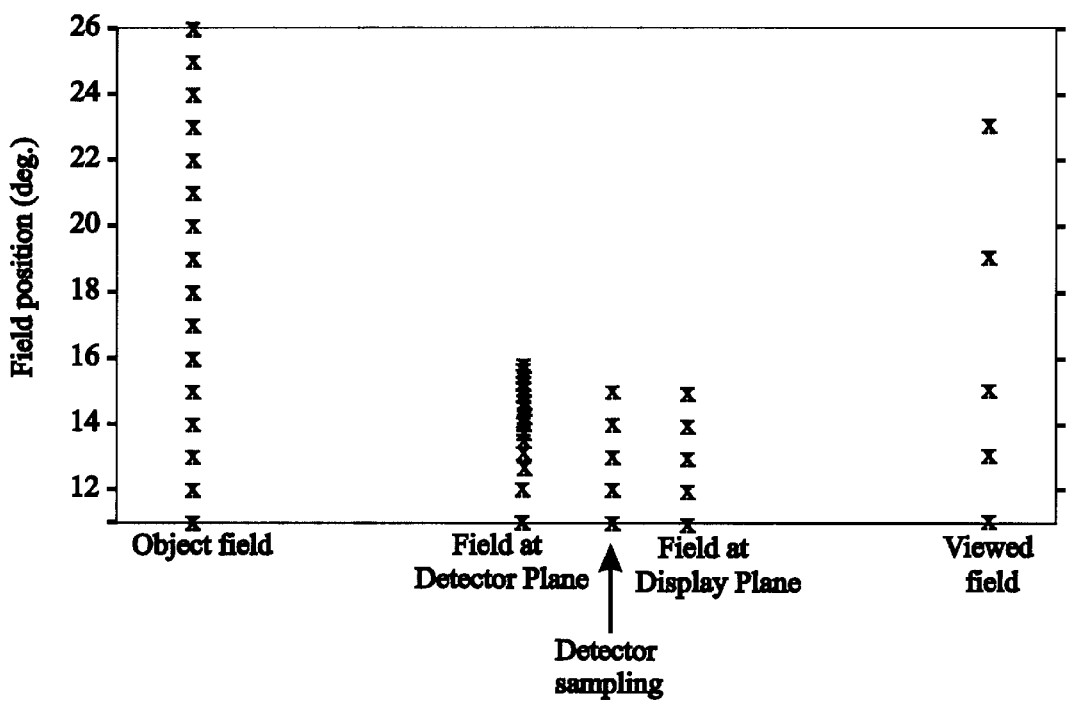
FIG. 3 shows the relative pixel spacing across the planes of a wide field of view vision system.

The operation of a vision system having a compression lens that matches the human visual acuity function at angles greater than 10° is illustrated in FIG. 3. The object field is illustrated with a point at each field position from 11° to 26°. For field position less than 10° there is no compression. The compression lens, positioned between the object and the detector, has a variable compression that increases with field position. At the detector plane the points just beyond 10° are slightly compressed and the outer points are substantially compressed. The detector has constant addressibility, i.e. a constant number of picture elements per inch. The variable compression imparts variable addressibility to the constant addressibility detector. The pixels at small angles each receive a smaller portion of the image than the pixels at large angles. This variation in resolution corresponds to the angular variation of the human visual acuity. The detector image is directly transferred to the display. The decompression lens, positioned between the display and the viewing field, remaps the distorted field to its initial configuration. At small field position the resolution of the viewed field is greater than at large field position.

For the compression lens of this invention the distortion is substantially zero for field positions less than θ. The term "substantially zero" refers to a distortion which deviates from zero by less than the acuity function, preferably within 5% of zero, and more preferably within 3%. To determine the angle θ, variable-resolution pictures were displayed to human participants on a computer monitor, where the size of the high-resolution field varied from image to image. The image was a landscape photograph. The test sets involved four sets of images that were created with high-resolution windows ranging from 4° to 14°. From these, image pairs were created using a 14° window and one window that varied from 4° to 13°. For each test, the test participant was shown an image pair using the same image, but varying the size of the window. After viewing each pair of images, the test subject was asked to judge whether the first or the second image was the better in quality or whether the images appear to be indistinguishable. Within the test sets there were also pairs of images that had the same sized window that were used to back-up the validity of the same response. Throughout the experiment, the subject was instructed to look only at the center of the display, which was marked at all times by a small white dot. A head-holder was also used to maintain the proper viewing distance from the screen. For this experiment, the distance was set such that the total viewing angle was 53.2°.

Figure 4:
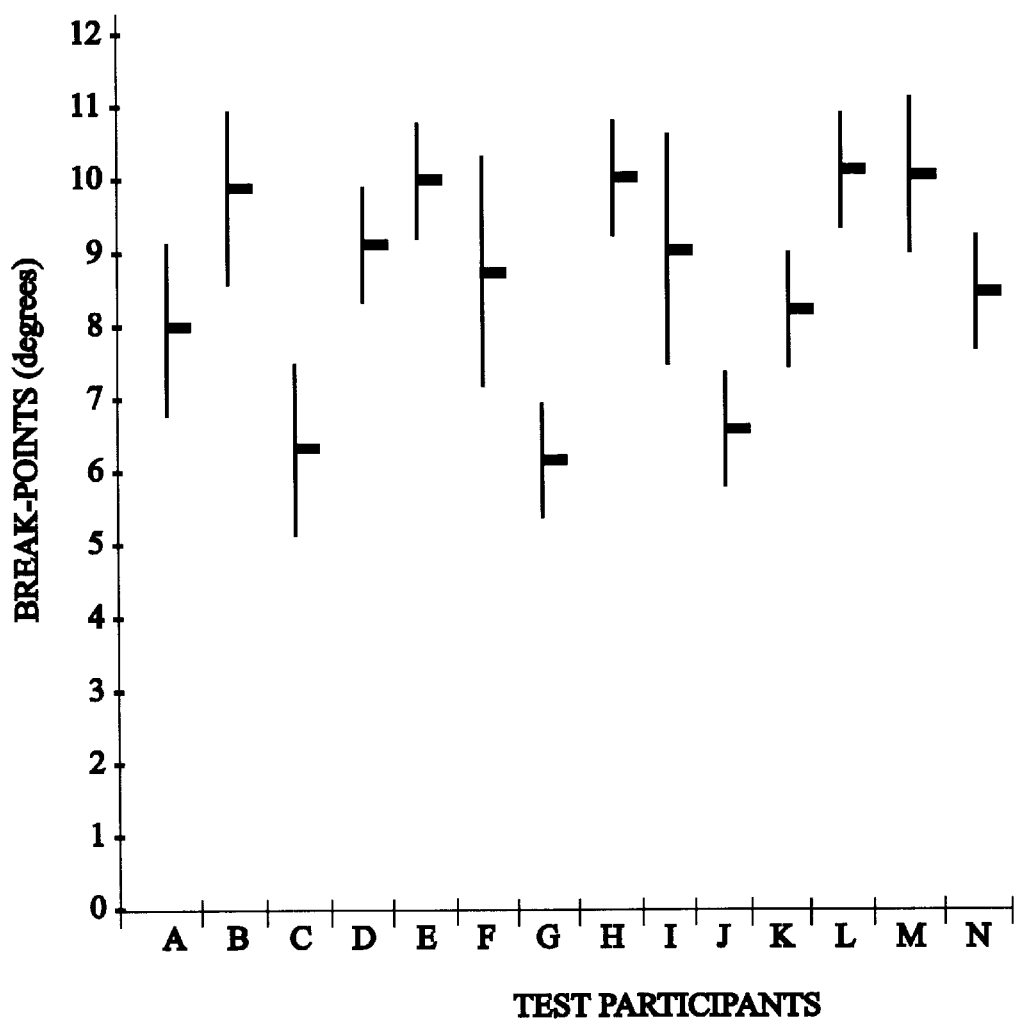
FIG. 4 shows the eye wander for test individuals.

The results of this experiment are shown in FIG. 4. This plot shows the mean break point for each individual tested and the standard deviation. The break point is defined as the angle at which the test subject is unable to reliably distinguish between different resolution settings. These data indicate that to allow for a reasonable amount of eye wander and individual differences, a 10° zero distortion window at the center of the field is adequate. The preferred angle θ depends on the application of the vision system. For narrowly targeted sites θ is preferably around 5°. To view larger images and to be able to move the eye without moving the vision system θ is preferably around 15°.

Figure 5:
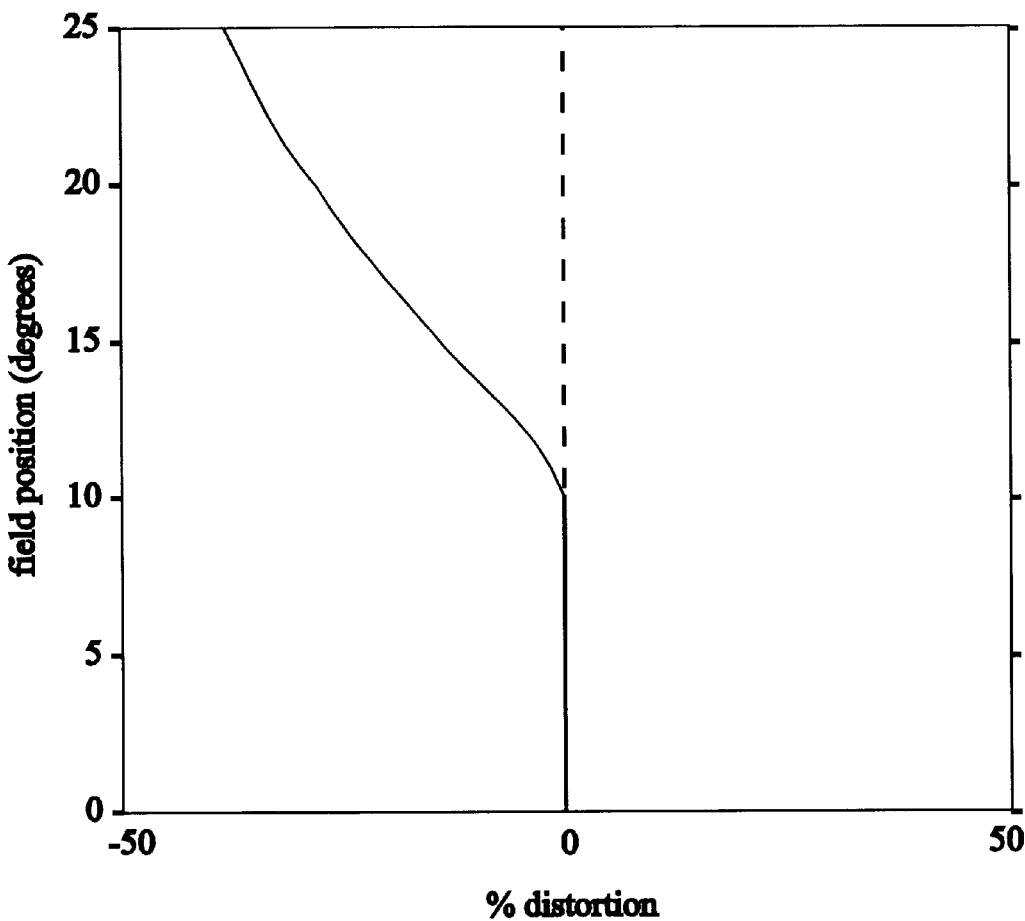
FIG. 5 is the ideal distortion of a compression lens.

The variation in addressibility across the field of view of the eye and the required central high addressibility window generate the optimum distortion curve shown in FIG. 5. In this curve, θ is around 10°. The distortion for field position >10° is matched to the human visual acuity function. The distortion for field position <10° is zero. A curve of this nature cannot be created just using 3rd order distortion. For that reason the desired mapping routine involves using combinations of linear and higher order distortion to create the variable addressibility system.

Standard lens design software, OSLO 6, was adapted for use in this unconventional lens design and special techniques were used to keep the optimization routines from yielding unrealistic results. Since this is a non-conventional design that tries to increase an aberration rather than minimize it some special techniques were used in the lens design phase. The large amounts of distortion had to be introduced slowly to keep the software from becoming over constrained and to keep the solution out of local minima. Other techniques used to bounce the program out of local minima were forcing a shorter total track and then letting the program relax, and reversing individual elements.

Figure 6:
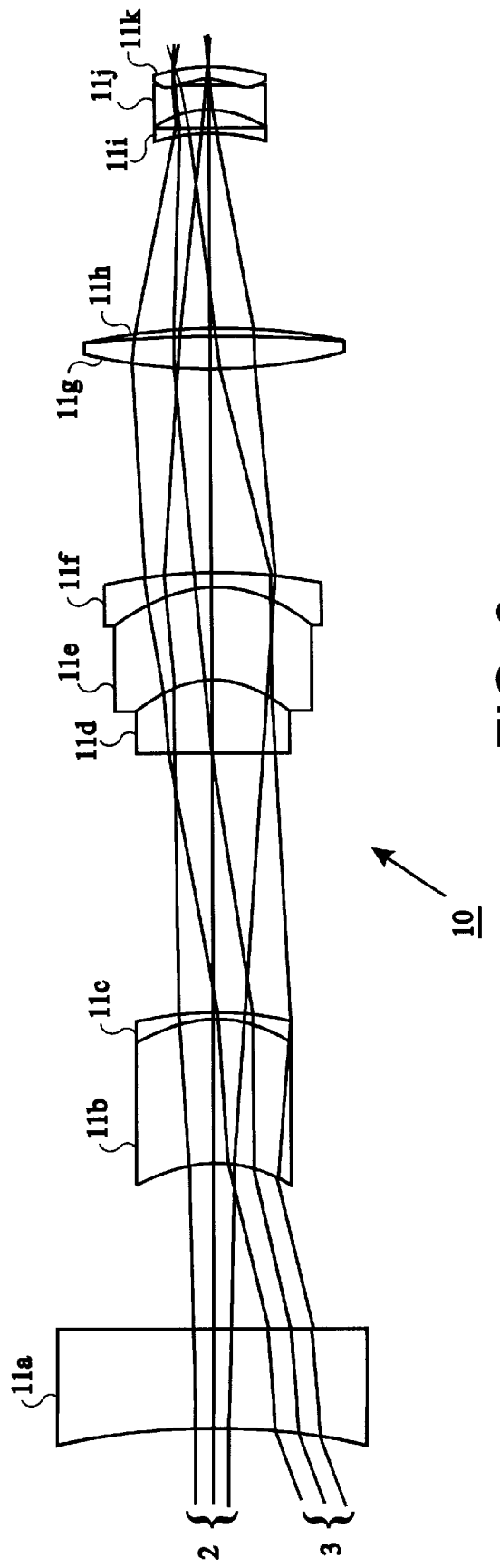
FIG. 6 is a first embodiment of the compression lens.

An embodiment of the compression lens 10 is shown in FIG. 6 and the lens data is given in Table 1. The lens has a 52° field of view and θ equals 10°. For all compression lenses illustrated herein the design wavelengths, i.e. the wavelengths at which they give the specified compression, were 738, 716 and 851 nm. These wavelengths are matched to the sensitivity of the image intensifier tube used in low light-level applications. This lens is not fully optimize but serves to illustrate several design features. The lens is a compound lens having 11 lenses, 11a–k. There is a trade-off between lens complexity and the distortion curve and image quality.

Rays are traced through the lens to illustrate the lens function. Rays 2 originate from a 0° field position and therefore strike the lens at normal incidence. Rays 3 originate from a full field position, i.e. at the maximum field of view, and therefore strike the lens at an angle. Rays 2 are focused by the lens to a point at the center of the image and rays 3 are focused to a point at the edge of the image.

In the table, each lens is described by two surfaces. The table gives the radius, thickness, aperture radius and material of each lens surface. The first line of the table corresponds to the object having infinite radius and thickness. The second corresponds to the distance through air between the object and the lens. The third corresponds to the aperture stop (AST). The final line corresponds to the image. Surfaces 3 and 4 correspond to lens 11a, surfaces 5 and 6 correspond to lens 11b, and so on. A negative radius corresponds to a concave surface and a positive radius corresponds to a convex surface. The thickness listed for a given surface is the distance between that surface and the following surface. Likewise the material listed for a given surface corresponds to the material between that surface and the following surface. Surface 19 of lens 11k is an aspheric surface. The lens surfaces in contact with air are preferably anti-reflection (AR) coated.

This lens has two lens doublets, 11b–c and 11g–h, and one lens triplet, 11d–f. Doublets and triplets are advantageous because AR coatings are not required on the abutting surfaces. Additionally, lens stability and ease of assembly are improved by abutting surfaces. The compound lens also has three component lenses 11i–k that, although not forming a triplet, are in contact on the edges. This also improves stability and ease of assembly. The compound lens contains three lenses, 11c, h and i, having center thickness less than about 0.1 mm. Thin lenses are not desired because of the fragility and difficulty of manufacture.

Figure 7:
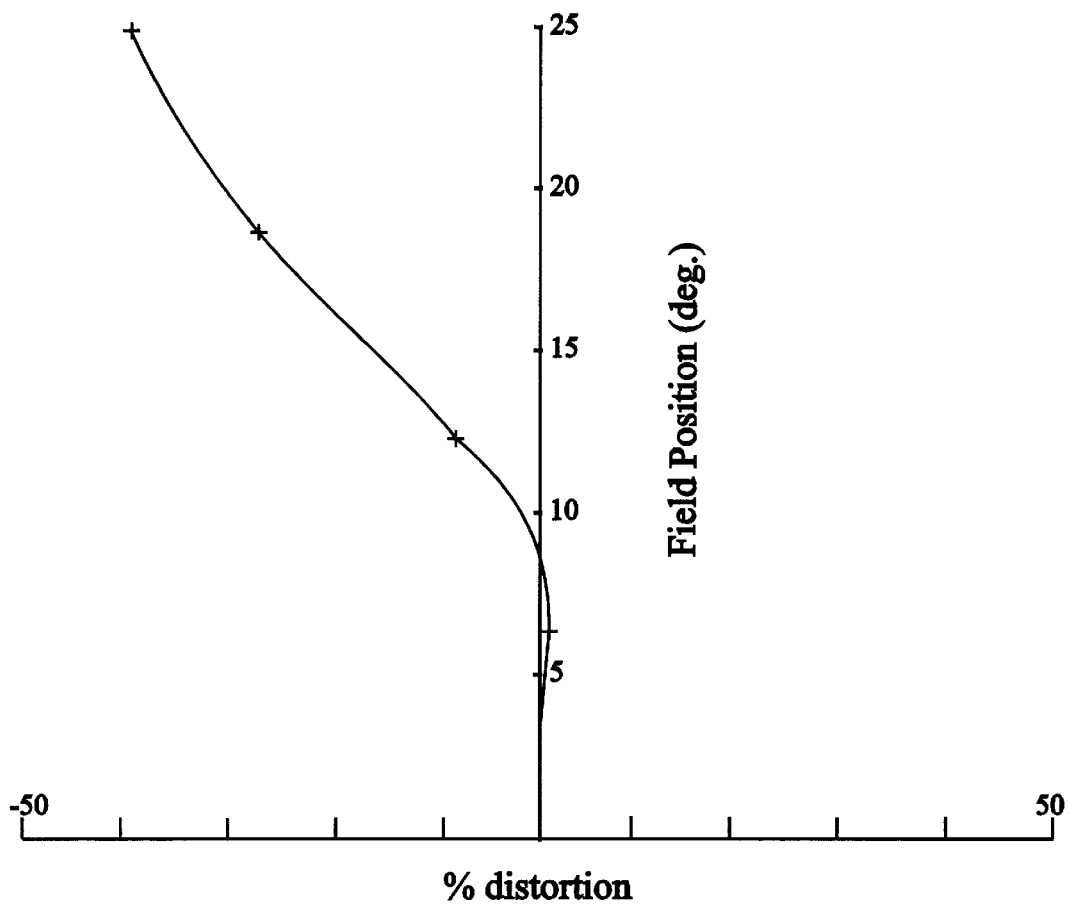
FIG. 7 is the distortion curve of the compression lens of FIG. 6.

The distortion curve of the lens of FIG. 6 is shown in FIG. 7. The lens has a distortion fall-off that matches the visual acuity of the eye in the peripheral area, while retaining a high-resolution central insert to compensate for eye wander. The target distortion curve was shown in FIG. 5. The distortion of this embodiment of the compression lens matches the desired distortion to within 3%.

Figure 8:
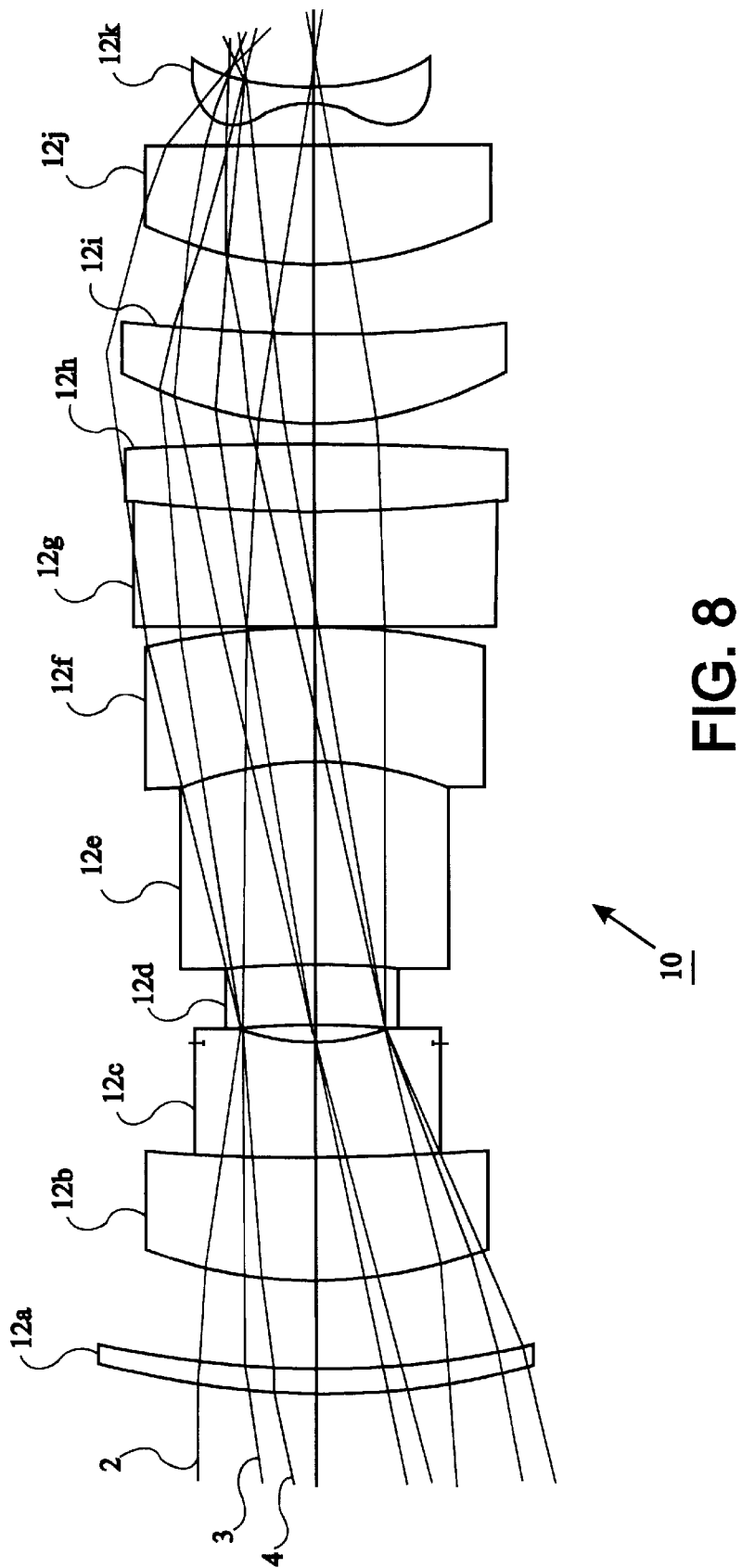
FIG. 8 is a second embodiment of the compression lens.

A second embodiment of the compression lens is shown in FIG. 8 and the lens data is listed in Table 2. The compound lens comprises 11 component lenses 12a–k. This lens has two lens doublets, 12b–c and 12g–h, and one lens triplet, 12d–f. The first lens doublet contacts the lens triplet. This lens is more compact than the first lens illustrated. It also has no lenses thinner than 1 mm.

The FOV of this lens is 26°. In this type of afocal system the magnification is equal to the angular field of the objective divided by the angular field of the eyepiece. For a fixed eyepiece field of angle of 52°, this objective lens gives a factor of two magnification. For lenses providing magnification M, the center constant resolution region is at fields <θ/M.

Figure 9:
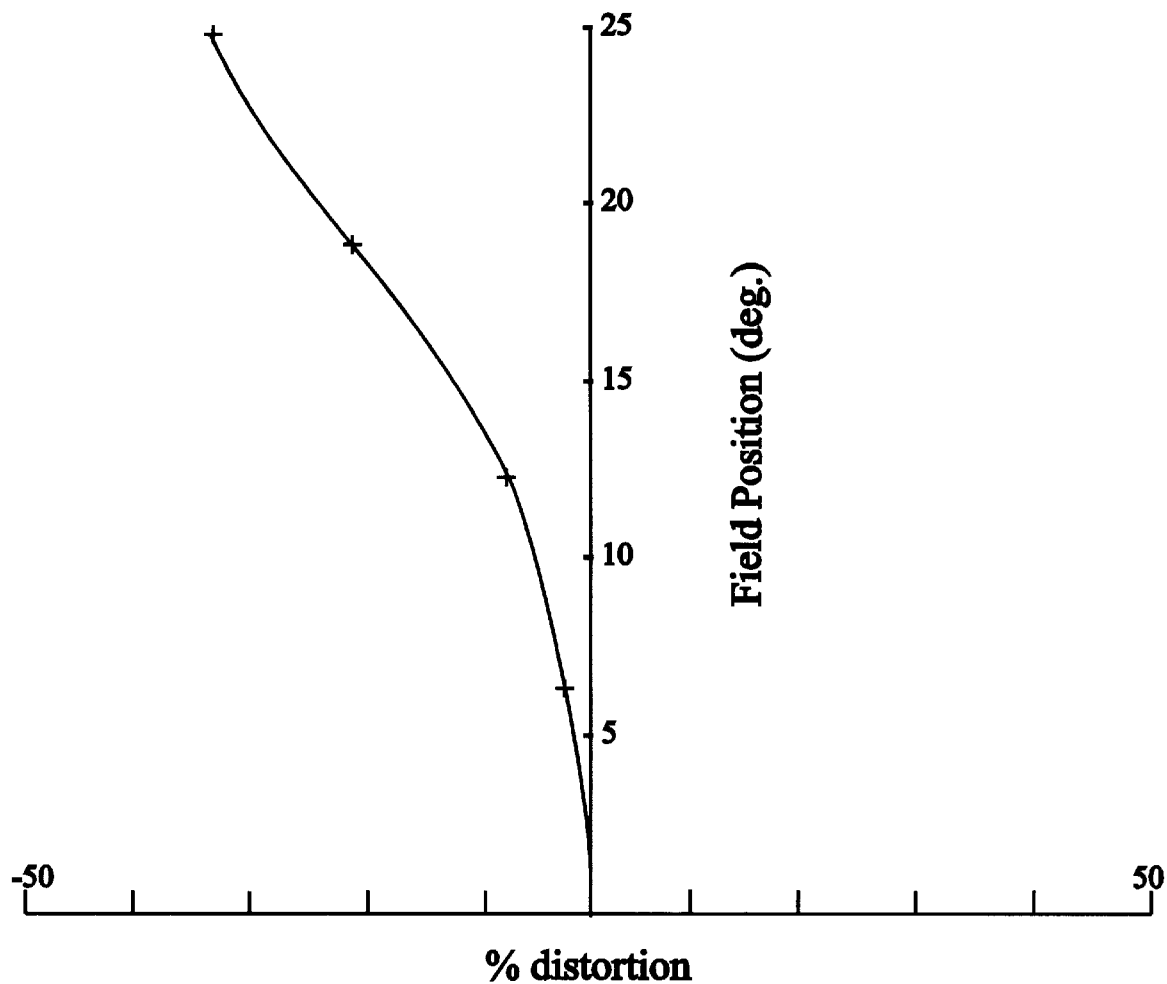
FIG. 9 is the distortion curve of the compression lens of FIG. 8.

In FIG. 8 three sets of rays 2, 3 and 4 are traced through the lens. Rays 2 originate from zero field position and are focused at the center of the image. Rays 3 and 4 originate at 0.7 and full field position and are focused increasingly far from the center of the image. The distortion curve of the lens of FIG. 8 is shown in FIG. 9.

Figure 10:
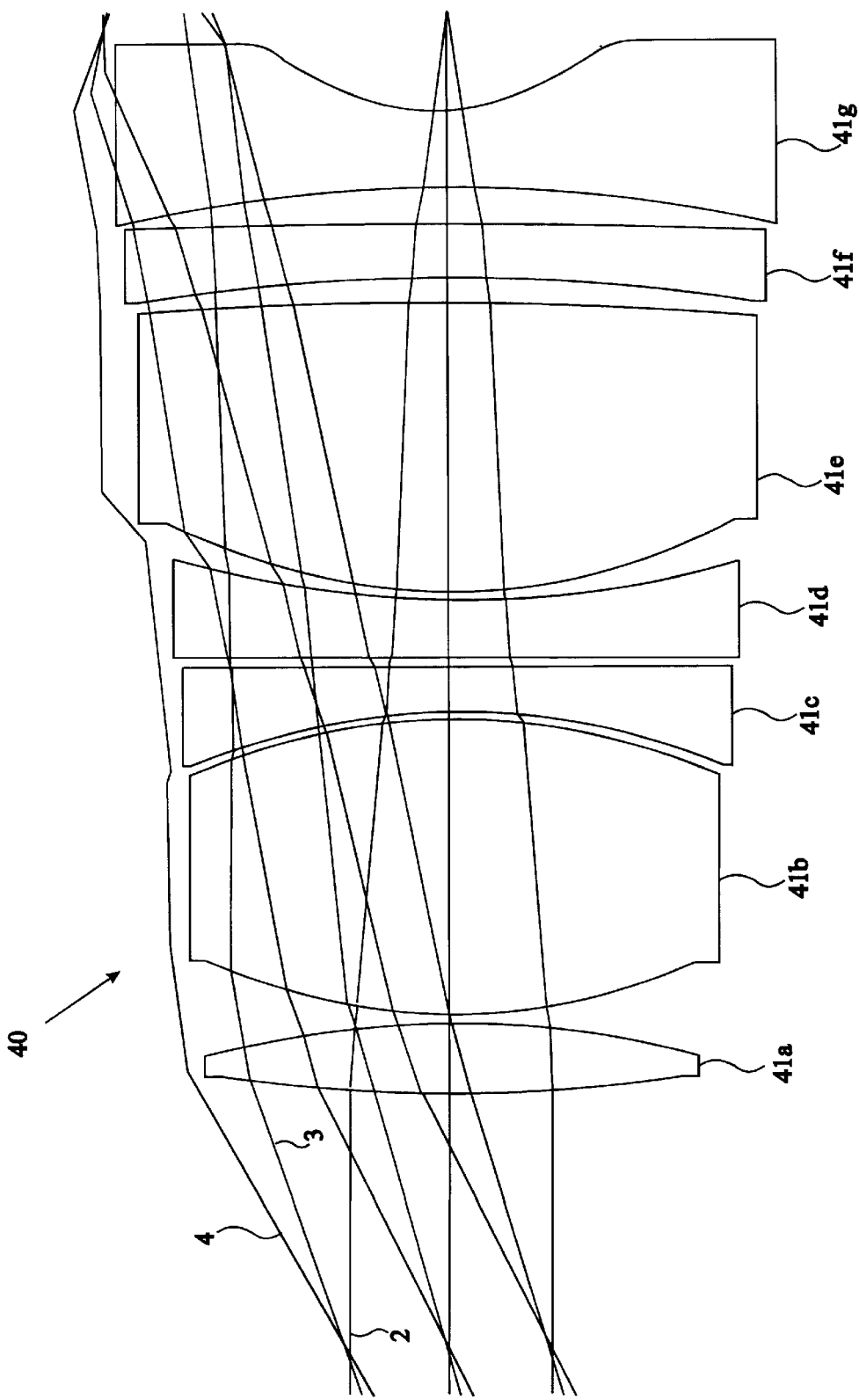
FIG. 10 is a decompression lens.

A decompression lens 40 of this invention is illustrated in FIG. 10 and the lens data is listed in Table 3. For all decompression lenses illustrated herein the field of view is 52°, which is selected to optimize axial resolution. The compound lens has seven lenses 41a–g. This lens is illustrated in the conventional manner, receiving light from the left and focusing it toward the right. For use as the eyepiece of FIG. 1, which takes a distorted image and reconstitutes the original image, the order of the elements is reversed. In the reverse operation, rays 2 are incident at the center of lens 41g and exit normal to lens 41a at zero field position. Rays 3 and 4 are incident increasingly far from the center of the lens and exit at the 0.7 and full field position.

Figure 11:
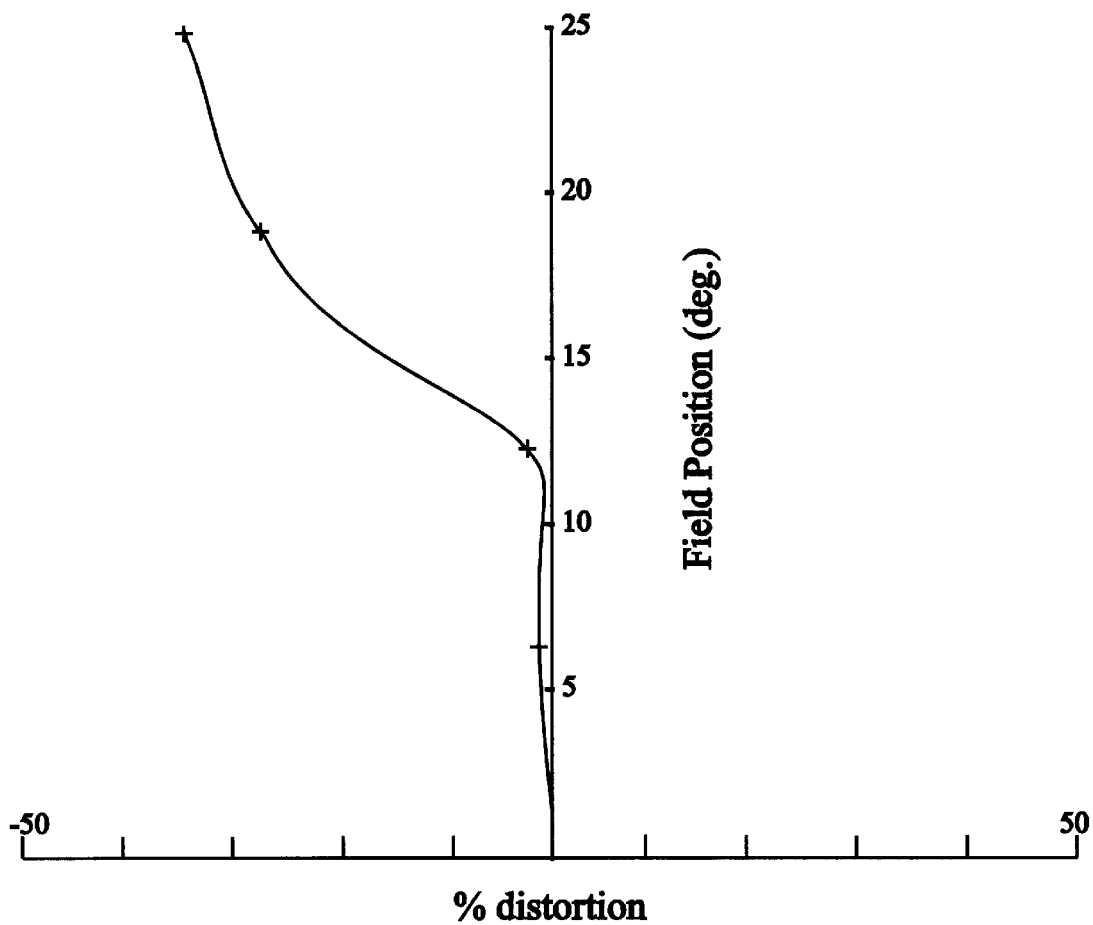
FIG. 11 is the distortion curve of the decompression lens of FIG. 10.

This embodiment of the decompression lens is fairly compact, although it has no doublets, triplets or contacting lenses. The design wavelengths for all the decompression lenses are 560, 529 and 596 nm. They are selected to match the output of the display. Surfaces 9 and 15 of component lenses 41d and 41g, are aspheric with conic and polynomial aspheric data given in the table. No lenses are thinner can about 1 mm. The distortion curve of the lens of FIG. 10 is shown in FIG. 11.

Figure 12:
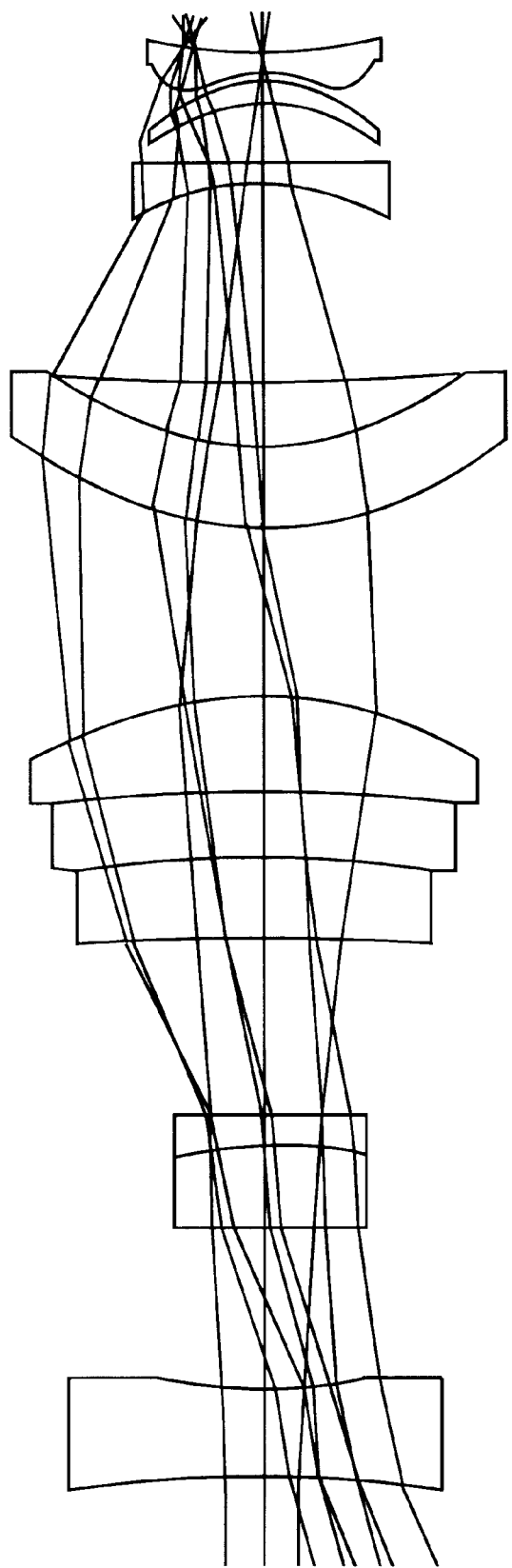
FIG. 12 is a compression lens.
Figure 13:
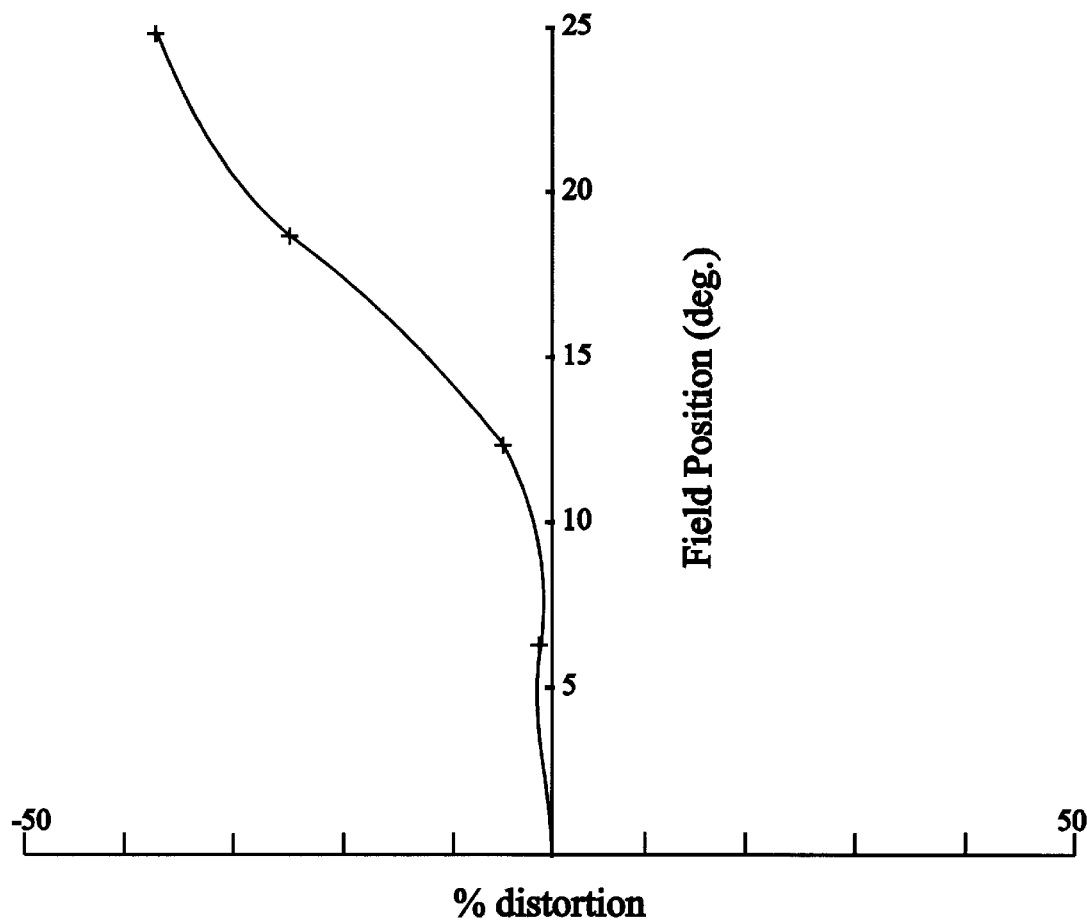
FIG. 13 is the distortion curve of the lens of FIG. 12.
Figure 14:
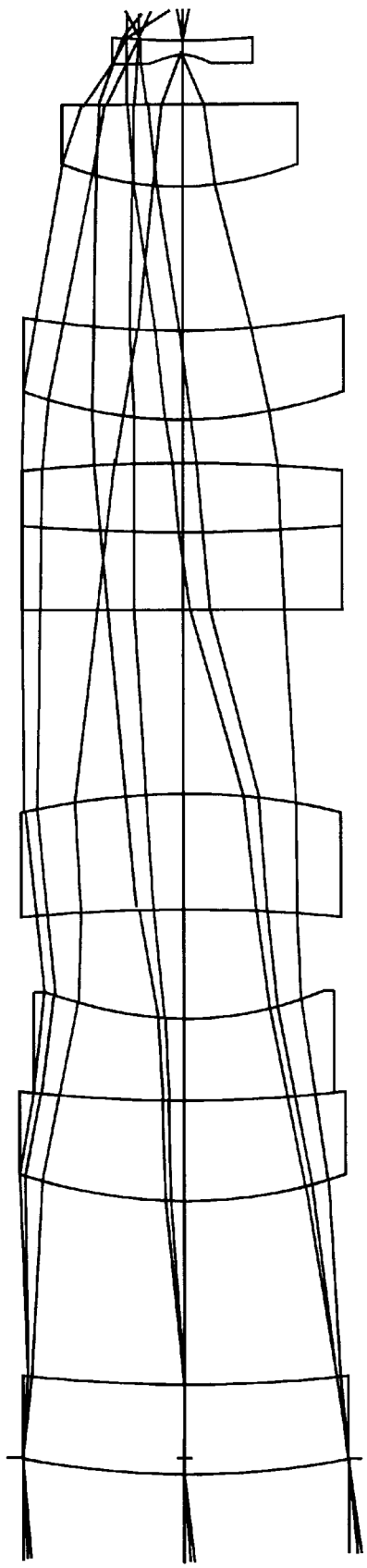
FIG. 14 is a compression lens.
Figure 15:
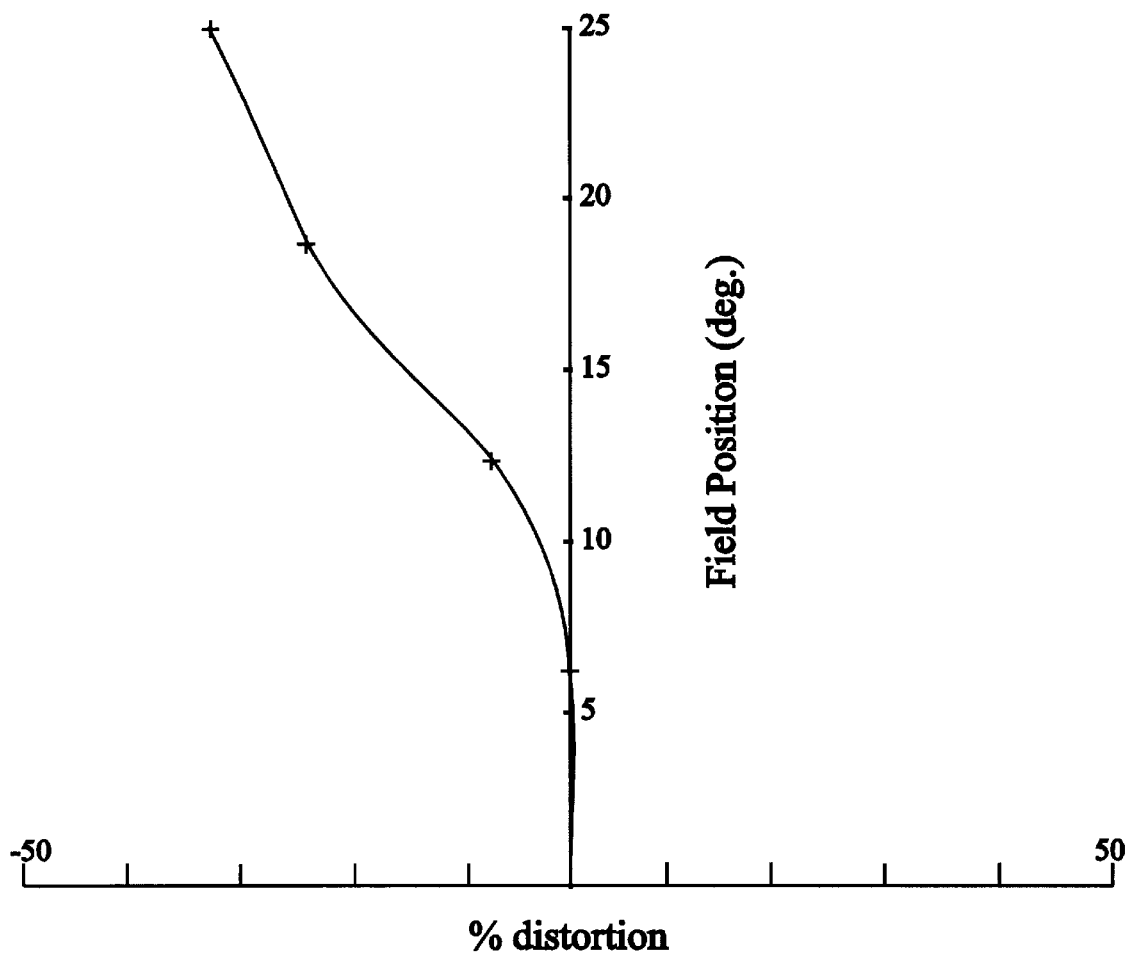
FIG. 15 is the distortion curve of the lens of FIG. 14.
Figure 16:
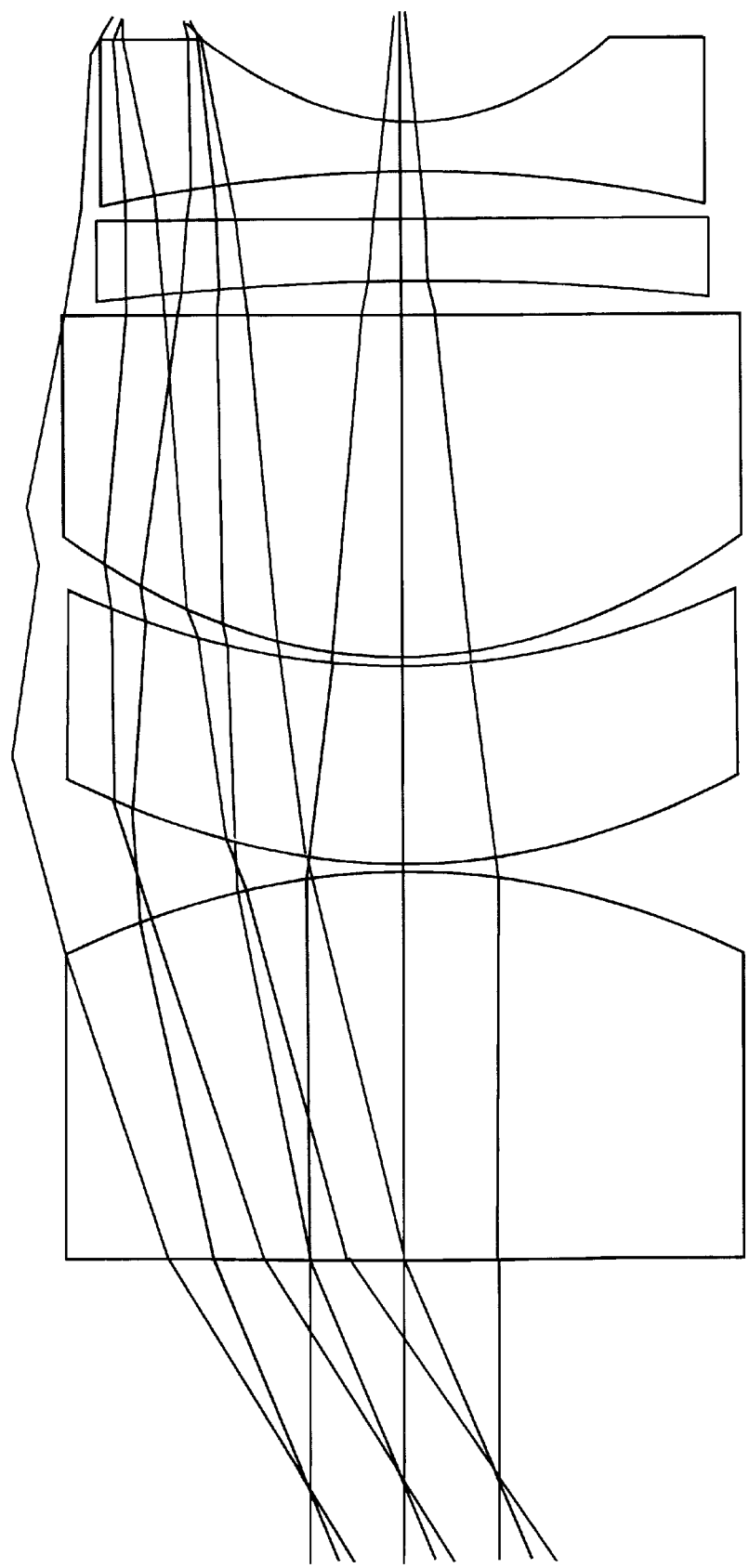
FIG. 16 is a decompression lens.
Figure 17:
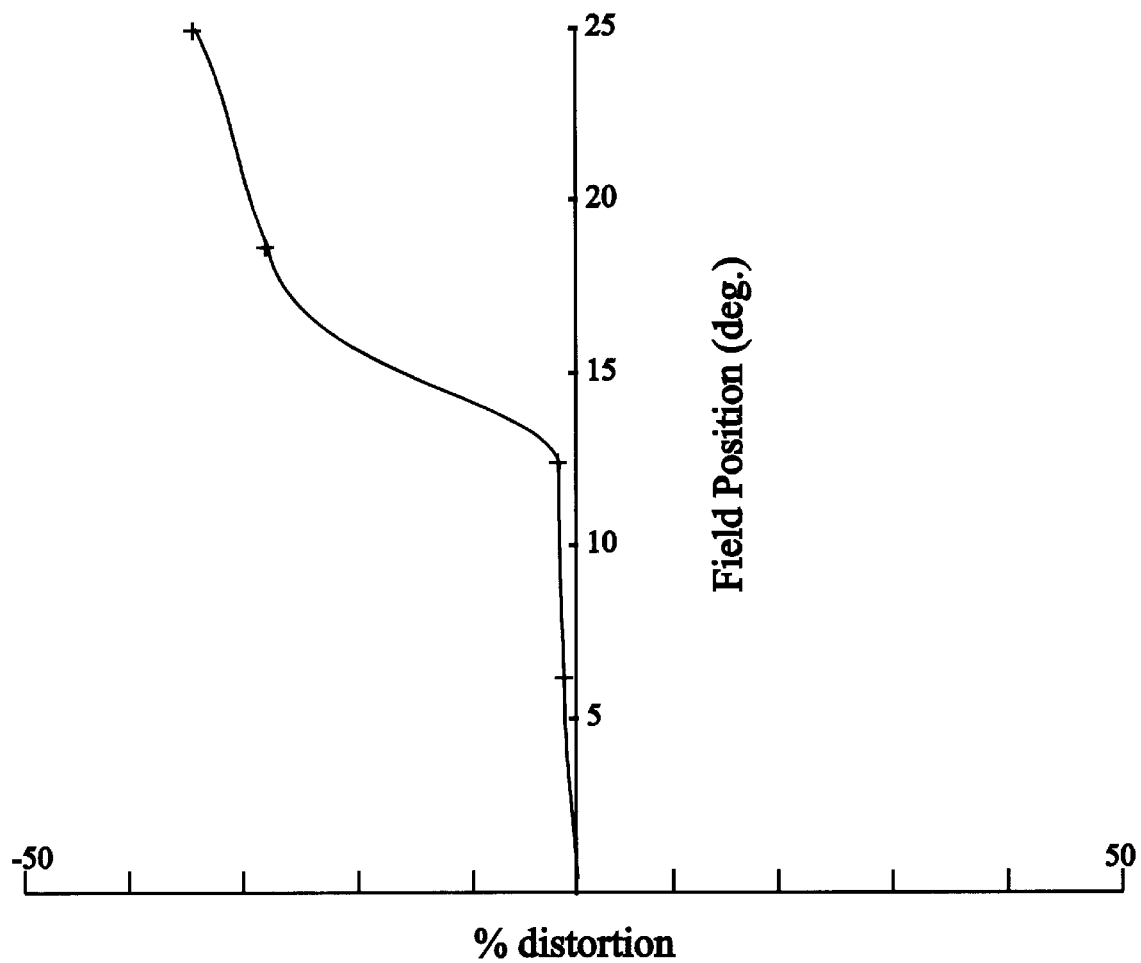
FIG. 17 is the distortion curve of the lens of FIG. 16.
Figure 18:
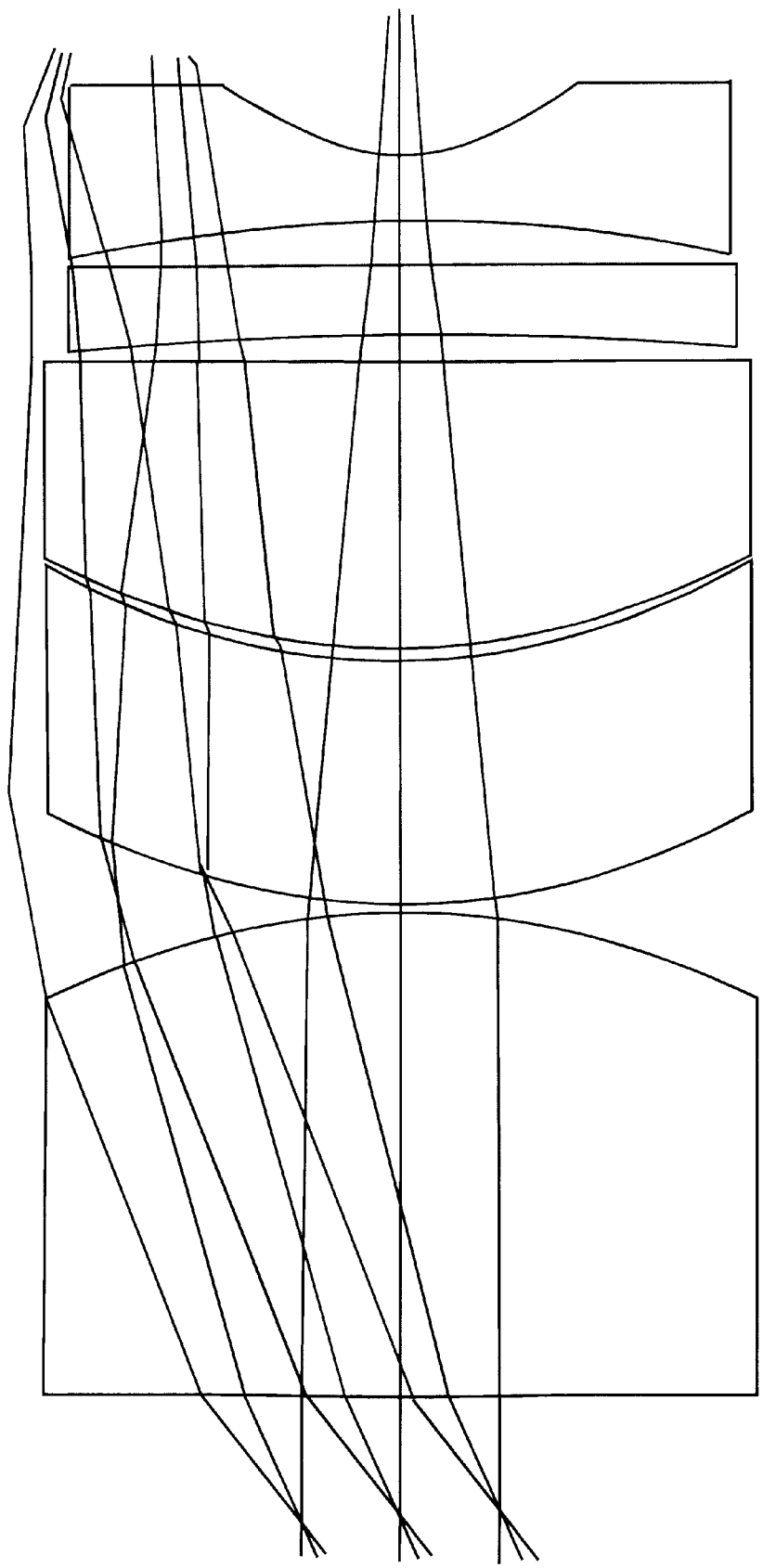
FIG. 18 is a decompression lens.
Figure 19:
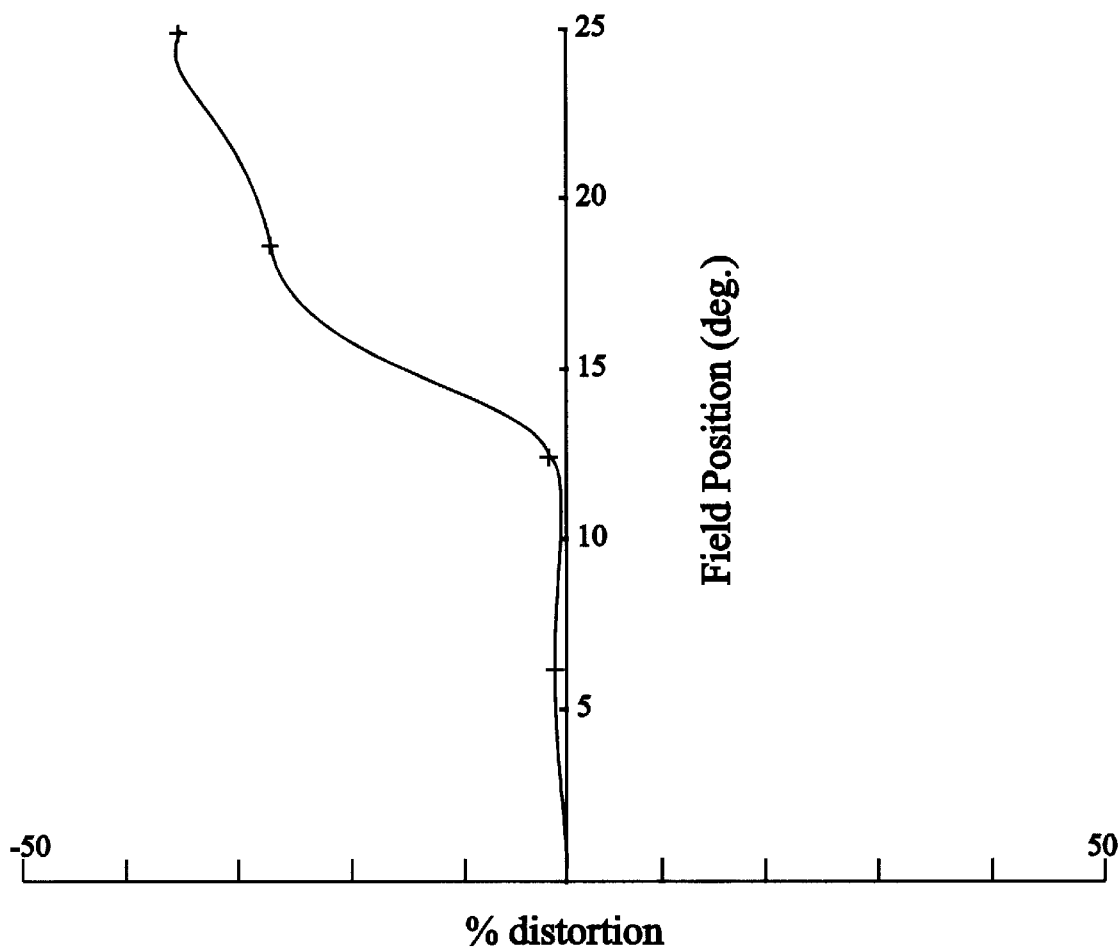
FIG. 19 is the distortion curve of the lens of FIG. 18.

Further compression lenses are shown in FIGS. 12 and 14 with the corresponding distortion curves in FIGS. 13 and 15. The FOVs are 52° and 13°, respectively, corresponding to magnification M=1 and 4. Further decompression lenses are shown in FIGS. 16 and 18 with the corresponding distortion curves in FIGS. 17 and 19. The lens data is given in Tables 4–7. The figures illustrate the multitude of lens designs that can yield the compound lenses of this invention. The lens design can be optimized according to the requirements of the application, such as weight, image quality, magnification and cost. Note that the eyepiece of FIG. 16 has only one ashpere.

The compression and decompression lenses of this invention can be used to advantage in several ways in the vision system. For a given sensor and display resolution, the distorting lenses can be used to increase the field of view. For a given field of view the distorting lenses reduce the sensor and display requirements. For storage of a collected image the memory requirements are reduced. If the sensing device is remote from the viewing device the bandwidth for image data transmission is reduced.

The vision system of this invention can be used to form monoculars or binoculars. For binoculars, first and second vision systems are mounted in a housing. The binoculars can be hand-held or mechanically mounted. For hand-held binoculars, the vision system is preferably light weight, comprising as few and as thin lenses as feasible. The lenses are preferably made of lightweight plastic. For mechanically mounted binoculars the image quality may be of more importance than the weight.

The sensing device and viewing device can be combined in a unitary structure or the sensing device can be remote from the viewing the device. The vision system has many applications in which it is advantageous to separate the sensing and viewing devices. The sensing device can be placed in a thermally, chemically or otherwise hostile environment while the viewing device is in a safe location. Similarly, for monitoring a geographically remote location such as the Arctic, under sea or space applications, the sensing device can be a long distance from the viewing device.

The image display of the viewing device can further include an image overlay device to overlay a second image on the object image. For example, a map can be overlaid on a landscape image. The display can also be used for data fusion wherein multiple sources of data provide information for a composite image. The composite image can show positions of objects such as aircraft, automobiles or targets that are located by a different means such as a different sensor.

All references cited herein are incorporated by reference in their entirely.

This invention has been illustrated with a few preferred embodiments that show the spirit of the invention. Numerous variations and applications will be readily apparent to those skilled in the art. The range and scope of the invention is defined in the following claims.

TABLE 1

| SRF | RADIUS | THICKNESS | APERTURE RADIUS | GLASS SPE | NOTE |
|---|---|---|---|---|---|
| OBJ | 1.000 | 1.000 | 4.877 | AIR | |
| 1 | 1.000 | 4.955 | 2830 | AIR | |
| AST | 1.000 | −4.955 | 0.258 | AIR | |
| 3 | −14.591 | 1.776 | 2.830 | LASFN9 | C |
| 4 | −36.179 | 2.598 | 2.515 | AIR | |
| 5 | −3.255 | 1.997 | 1.519 | LASFN31 | C |
| 6 | −3.057 | 0.101 | 1.542 | PSK52 | C |
| 7 | −7.186 | 4.986 | 1.535 | AIR | |
| 8 | 72.773 | 1.299 | 1.252 | SK5 | C |
| 9 | −2.463 | 1.999 | 1.496 | H_FD60 | C |
| 10 | −2.563 | 0.330 | 1.967 | LASFN31 | C |
| 11 | −4.573 | 3.708 | 2.055 | AIR | |
| 12 | 6.755 | 0.737 | 2.400 | SF10 | C |
| 13 | −20.437 | 0.127 | 2.331 | LASFN31 | C |
| 14 | −9.830 | 2.708 | 2.321 | AIR | |
| 15 | −4.651 | 0.104 | 1.378 | LAKN14 | C |
| 16 | 11.503 | 0.343 | 1.370 | AIR | |
| 17 | −2.496 | 0.305 | 1.348 | LAKN14 | C |
| 18 | 10.376 | 0.143. | 1.405 | AIR | |
| 19 | −1.563 | 0.323 | 1.463 | F2 | C* |
| 20 | −3.280 | 0.100 | 1.659 | AIR | |
| IMS | — | — | 1.726 | | |

TABLE 2

| SRF | RADIUS | THICKNESS | APERTURE RADIUS | GLASS |
|---|---|---|---|---|
| OBJ | Infinity | Infinity | Infinity | AIR |
| 1 | — | 20.259 | 12.362 | AIR |
| AST | Infinity | −20.259 | 7.685 | AIR |

TABLE 2-continued

| | | | | |
|---|---|---|---|---|
| 3 | 40.640 | 1.426 | 12.362 | LASFN9 |
| 4 | 54.600 | 3.364 | 11.985 | AIR |
| 5 | 25.460 | 8.081 | 10.970 | LASFN31 |
| 6 | 56.551 | 7.436 | 8.047 | PSK52 |
| 7 | 14.308 | 1.015 | 5.080 | AIR |
| 8 | -91.821 | 4.956 | 5.034 | SK5 |
| 9 | -35.208 | 14.345 | 6.082 | H_FD60 |
| 10 | -25.734 | 10.580 | 9.052 | LASFN31 |
| 11 | -42.611 | 0.186 | 11.307 | AIR |
| 12 | -153.354 | 8.477 | 11.339 | SF10 |
| 13 | 69.634 | 5.246 | 12.430 | LASFN31 |
| 14 | 119.815 | 1.137 | 12.972 | AIR |
| 15 | 22.610 | 6.713 | 13.085 | LAKN14 |
| 16 | 68.870 | 5.197 | 11.893 | AIR |
| 17 | 23.756 | 7.624 | 10.954 | LAKN22 |
| 18 | 1362.700 | 1.788 | 8.737 | AIR |
| 19 | -8.338 | 1.094 | 7.890 | F2 |
| 20 | 11.495 | 1.718 | 7.981 | AIR |
| IMS | — | — | 8.867 | |

CONIC AND POLYNOMIAL ASPHERIC DATA

| SRF | CC | AD | AE | AF | AG |
|---|---|---|---|---|---|
| 19 | -8.866 | 1.030E-04 | 8.352E-06 | 1.568E-08 | -2.9E-11 |

TABLE 3

| SRF | RADIUS | THICKNESS | APERTURE RADIUS | GLASS |
|---|---|---|---|---|
| OBJ | Infinity | Infinity | Infinity | AIR |
| AST | Infinity | 4.439 | 1.900 | AIR |
| 2 | 27.424 | 1.170 | 4.065 | FK5 |
| 3 | -16.056 | 0.108 | 4.392 | AIR |
| 4 | 12.823 | 5.093 | 4.422 | PK1 |
| 5 | -12.711 | 0.190 | 4.786 | AIR |
| 6 | -12.653 | 0.999 | 4.770 | LASF32 |
| 7 | -330.751 | 0.164 | 4.893 | AIR |
| 8 | -271.339 | 1.000 | 4.927 | LAFN7 |
| 9 | 18.438 | 0.104 | 5.055 | AIR |
| 10 | 10.708 | 5.052 | 5.099 | SK14 |
| 11 | -124.371 | 0.439 | 5.546 | AIR |
| 12 | -36.388 | 1.012 | 5.597 | LAKN14 |
| 13 | -127.225 | 0.633 | 5.729 | AIR |
| 14 | -27.749 | 1.272 | 5.850 | LAKN14 |
| 15 | 4.220 | 2.371 | 4.220 | AIR |
| IMS | — | — | 9.079 | |

CONIC AND POLYNOMIAL ASPHERIC DATA

| SRF | CC | AD | AE | AF | AG |
|---|---|---|---|---|---|
| 9 | 3.41903 | -0.00011 | 1.492E-05 | 1.761E-07 | -1.08E-08 |
| 15 | -5.64095 | 0.004154 | 0.000257 | 3.869E-06 | 1.567E-08 |

TABLE 4

| SRF | RADIUS | THICKNESS | APERTURE RADIUS | GLASS |
|---|---|---|---|---|
| OBJ | Infinity | Infinity | Infinity | AIR |
| 1 | Infinity | 1.991 | 1.385 | AIR |
| AST | Infinity | -1.991 | 0.258 | AIR |
| 3 | -11.390 | 0.965 | 1.385 | LASFN9 |
| 4 | 9.370 | 1.933 | 1.182 | AIR |
| 5 | -9.150 | 0.826 | 0.640 | LASFN31 |
| 6 | -3.082 | 0.267 | 0.691 | PSK52 |
| 7 | 9.787 | 1.838 | 0.759 | AIR |
| 8 | -19.827 | 0.965 | 1.586 | SK5 |
| 9 | -10.168 | 0.961 | 1.888 | H_FD60 |
| 10 | -8.828 | 0.996 | 2.175 | LASFN31 |
| 11 | -4.212 | 1.925 | 2.471 | AIR |
| 12 | 3.641 | 0.923 | 2.557 | SF10 |
| 13 | 3.696 | 0.574 | 2.311 | LASFN31 |
| 14 | 20.926 | 1.878 | 2.141 | AIR |

TABLE 4-continued

| | | | | |
|---|---|---|---|---|
| 15 | -2.331 | 0.150 | 1.268 | LAKN14 |
| 16 | -77.809 | 0.554 | 1.260 | AIR |
| 17 | -1.997 | 0.299 | 1.204 | LAKN14 |
| 18 | -1.689 | 0.100 | 1.259 | AIR |
| 19 | -1.431 | 0.299 | 1.239 | F2 |
| 20 | 2.681 | 0.202 | 1.301 | AIR |
| IMS | — | -0.011 | 1.421 | |

*CONIC AND POLYNOMIAL ASPHERIC DATA

| SRF | CC | AD | AE | AF | AG |
|---|---|---|---|---|---|
| 8 | 15.088 | 6.479E-03 | -1.31E-03 | 2.11E-03 | 7.020E-04 |
| 19 | -49.541 | -1.029 | 2.266 | -1.520 | 0.366 |

TABLE 5

| SRF | RADIUS | THICKNESS | APERTURE RADIUS | GLASS |
|---|---|---|---|---|
| OBJ | Infinity | Infinity | Infinity | AIR |
| AST | 75.23 | 8.18 | 14.98 | LASFN9 |
| 2 | 108.10 | 19.22 | 14.74 | AIR |
| 3 | 50.07 | 9.96 | 15.92 | LASFN31 |
| 4 | 120.64 | 9.95 | 14.78 | PSK52 |
| 5 | 28.17 | 10.28 | 13.65 | AIR |
| 6 | -291.03 | 9.94 | 14.76 | SK5 |
| 7 | -80.82 | 18.31 | 15.62 | AIR |
| 8 | -597.03 | 8.09 | 16.08 | SF10 |
| 9 | 196.02 | 6.75 | 16.28 | LASFN31 |
| 10 | -226.67 | 3.66 | 16.40 | AIR |
| 11 | 38.28 | 8.86 | 16.28 | LAKN14 |
| 12 | 99.27 | 13.29 | 14.58 | AIR |
| 13 | 28.63 | 7.84 | 11.61 | LAKN22 |
| 14 | 383.90 | 4.51 | 9.29 | AIR |
| 15 | -2.87 | 1.33 | 2.87 | F2 |
| 16 | 45.20 | 0.44 | 8.06 | AIR |
| IMS | — | — | 8.57 | |

CONIC AND POLNOMIAL ASPHERIC DATA

| SRF | CC | AD | AE | AF | AG |
|---|---|---|---|---|---|
| 15 | -1.50445 | 0.003214 | -3.42E-06 | -1.12E-06 | 1.40E-08 |

TABLE 6

| SRF | RADIUS | THICKNESS | APERTURE RADIUS | GLASS |
|---|---|---|---|---|
| OBJ | Infinity | Infinity | Infinity | AIR |
| AST | Infinity | 5.082 | 1.900 | AIR |
| 2 | 49.249 | 7.385 | 4.379 | FK5 |
| 3 | -16.674 | 0.100 | 6.583 | AIR |
| 4 | 12.976 | 4.130 | 6.608 | PK1 |
| 5 | 16.563 | 0.100 | 6.592 | AIR |
| 6 | 11.972 | 6.302 | 6.612 | SK14 |
| 7 | -203.588 | 0.528 | 6.067 | A1R |
| 8 | -36.734 | 1.584 | 5.985 | LAKN14 |
| 9 | 411.994 | 0.835 | 5.945 | AIR |
| 10 | -26.629 | 1.003 | 5.917 | LAKL21 |
| 11 | 3.926 | 2.211 | 3.926 | AIR |
| IMS | — | — | 8.391 | |

CONIC AND POLYNOMIAL ASPHERIC DATA

| SRF | CC | AD | AE | AF | AG |
|---|---|---|---|---|---|
| 11 | -4.488 | 5.268E-03 | -2.93E-04 | 3.441E-06 | 3.032E-09 |

TABLE 7

| SRF | RADIUS | THICKNESS | APERTURE RADIUS | GLASS |
|---|---|---|---|---|
| OBJ | Infinity | Infinity | Infinity | AIR |
| AST | Infinity | 3.101 | 1.900 | AIR |
| 2 | 27.359 | 8.919 | 3.412 | FKS |
| 3 | −16.151 | 0.110 | 5.969 | AIR |
| 4 | 13.396 | 4.315 | 5.996 | PK1 |
| 5 | 16.390 | 0.180 | 6.054 | AIR |
| 6 | 12.697 | 5.348 | 6.092 | SK14 |
| 7 | −120.804 | 0.321 | 5.814 | AIR |
| 8 | −45.321 | 1.061 | 5.778 | LAKN14 |
| 9 | −187.603 | 0.590 | 5.763 | AIR |
| 10 | −30.374 | 1.430 | 5.737 | LAKL21 |
| 11 | 3.605 | 2.580 | 3.605 | AIR |
| IMS | – | — | 8.667 | |

| CONIC AND POLYNOMIAL ASPHERIC DATA | | | | | |
|---|---|---|---|---|---|
| SRF | CC | AD | AE | AF | AG |
| 5 | 3.503 | 3.680E-04 | −2.77E-06 | −3.13E-08 | −6.50E-10 |
| 11 | −4.203 | 4.521E-03 | 2.820E-04 | 3.711E-06 | −4.75E-09 |

We claim:

1. A compression lens comprising a plurality of optically coupled lenses and having a composite distortion substantially equal to zero for field positions less than a value $\theta/M$ and substantially matched to a human visual acuity function for field positions greater than $\theta/M$, where $\theta$ is the viewing angle as measured with respect to a central axis and M is the magnification and $\theta/M$ is greater than 5°.

2. The compression lens of claim 1 wherein $5°<\theta/M<15°$.

3. The compression lens of claim 1 wherein $\theta/M$ is about 10°.

4. The compression lens of claim 1 wherein, for field positions greater than about $\theta/M$, the difference between said composite distortion and the human visual acuity function is less than 5%.

5. The compression lens of claim 1 wherein only one surface of one of said lenses is aspheric.

6. An imaging device comprising the compression lens of claim 1 and further comprising an image tube phosphor optically coupled therewith.

7. An imaging device comprising the compression lens of claim 1 and further comprising an image sensor optically coupled therewith.

8. The imaging device of claim 7 wherein the design wavelengths of said compression lens match the sensitivity of said image sensor.

9. The imaging device of claim 7 wherein said image sensor is a CCD.

10. The imaging device of claim 7 wherein said image sensor is an infrared image sensor.

11. The imaging device of claim 7 further comprising an image intensifier positioned between said compression lens and said image sensor.

12. A vision system comprising the imaging device of claim 7 and further comprising an image display coupled with said image sensor.

13. The vision system of claim 12 further comprising a decompression lens optically coupled with said image display.

14. A decompression lens comprising a plurality of optically coupled lenses and having a composite distortion substantially equal to zero for field positions less than an angle $\theta$ and substantially matched to the inverse of the human visual acuity function for field positions greater than $\theta$, where $\theta$ is greater than 5°.

15. The decompression lens of claim 14 wherein $5°<\theta<15°$.

16. The decompression lens of claim 14 wherein $\theta$ is about 10°.

17. A viewing device comprising the decompression lens of claim 14 further comprising an image display optically coupled with said decompression lens.

18. The viewing device of claim 17 wherein the design wavelengths of said decompression lens match the output of said display.

19. The viewing device of claim 17 further including an image overlay device coupled with said image display.

20. A vision system comprising the viewing device of claim 17 and further comprising a remote-image receiver electronically coupled with said image display.

21. A vision system comprising the viewing device of claim 17 and further comprising an image sensor coupled with said image display.

22. The vision system of claim 21 further comprising a compression lens optically coupled with said image sensor.

23. A pair of wide field of view binoculars comprising a housing and further comprising first and second vision systems of claim 22 mounted thereon.

* * * * *